Figure 1:
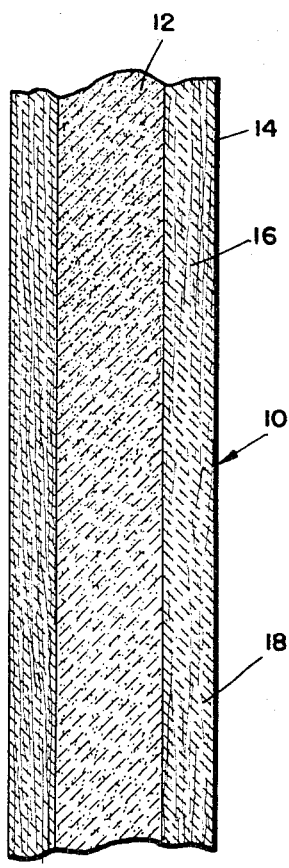

United States Patent
Bortz et al.

[15] 3,662,405
[45] May 16, 1972

[54] REINFORCED POROUS CERAMIC BONE PROSTHESIS

[72] Inventors: Seymour A. Bortz, Highland Park; Harold L. Rechter, Chicago; William E. Reynolds, Western Springs; Seymour Bazell, Chicago, all of Ill.

[73] Assignee: IIT Research Institute, Chicago, Ill.

[22] Filed: Mar. 12, 1969

[21] Appl. No.: 806,578

[52] U.S. Cl. .................................... 3/1, 106/40 R, 128/92 C
[51] Int. Cl. ............................................................ A61f 1/24
[58] Field of Search .............. 3/1; 128/92, 92 C, 92 CA, 92 F, 128/92 G; 32/10 A; 106/40 R

[56] References Cited

UNITED STATES PATENTS

| 448,745 | 3/1891 | Wright | 32/10 A |
|---|---|---|---|
| 2,679,245 | 5/1954 | Timmermans | 128/92 CA |
| 3,314,420 | 4/1967 | Smith et al. | 128/92 R |
| 3,462,765 | 8/1969 | Swanson | 3/1 |
| 2,210,424 | 8/1940 | Morrison | 32/10 A |

FOREIGN PATENTS OR APPLICATIONS

| 1,122,634 | 5/1956 | France | 128/92 C |
| 1,500,461 | 9/1967 | France | 3/DIG. 3 |

Primary Examiner—Richard A. Gaudet
Assistant Examiner—Ronald L. Frinks
Attorney—Fitch, Even, Tabin & Luedeka

[57] ABSTRACT

A structural member having a core of porous material permitting fluid flow and an outer layer of composite material having rigid matrix with reinforcing material embedded therein. The member finds its primary use in prosthetics.

3 Claims, 2 Drawing Figures

PATENTED MAY 16 1972 3,662,405

INVENTORS
SEYMOUR A. BORTZ
HAROLD L. RECHTER
WILLIAM E. REYNOLDS
SEYMOUR BAZELL

ATTYS.

REINFORCED POROUS CERAMIC BONE PROSTHESIS

This invention relates to structural members used as a prosthesis for human bone and made from composite members. More particularly it is directed to structural members made of composite materials including a matrix material and a reinforcing material embedded in the matrix.

A composite material is made up of a matrix phase and a discontinuous phase. Normally the matrix phase is a continuous phase and the discontinuous phase is made up of discrete pieces of reinforcing material. The reinforcing material may be in the form of filaments, fibers, flakes or powder and is added to the continuous matrix phase to lend some desirable property to the composite material not possessed by the matrix phase alone. For example, if the matrix phase is extremely resilient the reinforcement might be added to provide additional strength while retaining the resiliency of the matrix material.

In the case of ceramic composites the discontinuous phase or reinforcement may be provided for any number of reasons. The general properties of ceramic material can best be described by the terms mechanical brittleness, low tensile strength, rigidity, and high temperature strength. A ceramic has no appreciable yield strength and exhibits brittle failure. It is known that the brittleness and lack of plastic behavior in ceramics can be modified by the addition of a discontinuous phase of reinforcing material such as mild steel. When the proportions are correct, the resultant composite exhibits an elastic-plastic stress-strain curve similar to that exhibited by ductile materials. At the same time it retains many desirable properties of ceramic such as controllable porosity and chemical inertness when a non-reactive reinforcement is used.

As previously mentioned, the present invention finds particular application in the growing field of prosthetics. Bone implants are becoming an increasingly common thing in modern medicine. Several bone substitutes are already available for implant. Among the materials employed have been stainless steels, ceramics and plastics. Each of these materials suffers some limitations when used as a prosthesis. Many plastics are subject to attack by body chemicals or are rejected by the body's natural rejecting mechanism. Stainless steel is non-reacting but it is not well adapted to a knitting with the remaining bone structure in the case of splicing since it is not porous. There is further difficulty in adapting the stainless steel to the socket of an existing joint without having to replace the socket itself. Ceramic materials have been found to be too weak and brittle for the constant flexural stress applied to bones. The novel concept presented herein overcomes these and other difficulties encountered in the implant of a prosthesis.

A better understanding of the present invention will be facilitated by a brief explanation of the function and structure of human bones, which are, of course, the principal structural members of the human body. A natural bone derives its strength from an outer layer of relatively hard material. The material is strong under tensile loading, is durable under flexural loading and is to a certain extent flexible. Inside the outer layer is a softer area of the bone which does not provide much structural support but rather supplies the life needs of the bone. Blood and other body fluids flow within this inner section of the bone.

Bones are attached to each other at joints by means of muscles, tendons and ligaments. In a typical moving joint such as the elbow or the hip, the ends of two bones are placed together in sliding contact with cartilage and lubrication between them. Under normal circumstances, the joint will undergo thousands of flexures in a lifetime without deterioration. The durability of the joint is not due solely to the presence of the cartilage, which is a gelatin-like material. The chief prevention from wear and tear on the cartilage is provided by natural body lubrication which, in a natural joint, is provided by a fluid secreted by the body and called synovial fluid. The major constituent in synovial fluid is the mucin molecule, a cement substance combined with a protein to form an elongated molecule. The mucin molecules exist as polymers of variable lengths. In addition to the mucin molecules, the synovial fluid also contains glucose, amino acids and other cellular nutrients. Therefore the synovial fluid not only acts as a lubricant but also nourishes the cartilage. When the circulation of synovial fluid is stopped for a period of time, the cartilage cells in the region nearest the surface of contact die, eventually causing a bearing type failure of the bone at the joint. This is true even though an artificial lubricant is applied if no nutrition is received by the cartilage.

From the foregoing, it is apparent that any prosthesis which is to be of more than limited success without the total replacement of the cartilage and the mating half of the joint must in some way permit or even assist in promoting the continued presence of synovial fluid in the joint.

Accordingly, an object of the present invention is to provide an improved composite reinforced bone prosthesis.

A further object of the present invention is to provide an improved bone prosthesis made of ceramic composite material.

Still a further object of the invention is to provide an improved bone prosthesis designed to accommodate predetermined stresses through the engineering of the reinforcement phase of a ceramic composite.

Another object of the present invention is to provide an improved bone prosthesis having high strength chemical inertness and having bearing surfaces capable of receiving and retaining a fluid.

Figure 2:
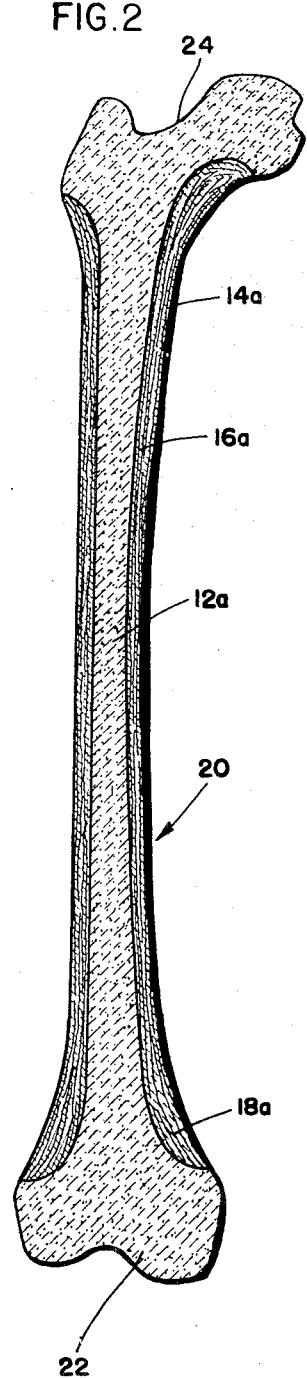

Other objects and advantages of the invention will be apparent from the following description taken in connection with the accompanying drawings in which:

FIG. 1 is a partial sectional view taken through a member embodying the features of the present invention; and FIG. 2 is a sectional view of a prosthesis embodying the present invention.

Briefly the present invention relates to a composite article 10 as illustrated in FIG. 1. The article, regardless of its ultimate use or configuration, includes bearing surfaces at spaced points on the article. For convenience, the article is shown in FIG. 1 as a straight column having the components common to other contemplated configurations. In the illustrated embodiment an inner core 12 of porous material is provided which extends from one end of the column to the other. The core 12 is of sufficient porosity to permit fluid to be forced through the pores from one end of the column to the other under pressure. The core 12 is surrounded by a composite ceramic material 14. The composite material is illustrated in the form of a circular cylinder which is preferably bonded to the core 12. The composite material preferably has a continuous matrix 16 of ceramic material with elongate reinforcing material 18 embedded therein. In the embodiment illustrated, the elongate reinforcing material 18 is oriented in parallel fashion running lengthwise of the column.

As briefly described above, the structure shown in FIG. 1 finds its primary use as a prosthesis for human bone. The embodiment illustrated in FIG. 2 shows a prosthesis 20 for a human femur. The core 12a (The subscript "a" is employed for elements in FIG. 2 corresponding to elements in FIG. 1.) of porous material has as its chief function the retention and circulation of the body's natural fluids or other added fluids through the structure of the prosthesis to make the fluids available at the joints for proper movement. The material employed for the core is preferably truly porous, that is, the pores communicate to form a network through the material to permit fluid to flow under pressure. An additional function of the core material is to act as a bearing surface for a joint. The joint stresses are primarily compressive and are adequately supported by the porous core 12a.

In order to achieve adequate structural integrity as well as porosity, the core 12a is normally formed by conventional casting of an aqueous slurry in a mold with a chemical binder. Casting techniques are preferable to foaming which tends to produce a porous but friable structure. The materials are selected for grain size and consistency to provide the desired degree of porosity and strength. The temperature and pressure of molding is also chosen to provide the optimum properties of porosity desired for the flow of lubricant. These parameters are well known in the art. At the present time ceramics appear to be best suited for forming the central core 12a. The reason for their desirability is a combination of ease of forming and chemical inertness both to rejection by the body and to attack by body fluids. At the same time porous ceramics exhibit high compressive strength needed to support the body's weight in the joints. It is possible that in the future a plastic or other porous material will be discovered which will be equally suitable from the standpoint of strength and chemical compatibility with the body fluids.

In a structural application such as a prosthesis for a human femur the core 12a is preferably formed into joints 22, 24 at each end of the prosthesis and is continuous through the length of the prosthesis (FIG. 2). For other lower stress applications in which it is not necessary for the fluid to be communicated to both ends of the prosthesis a porous core may be employed for the joint which extends only partially into the structure of the prosthesis thereby retaining the lubricant though not permitting flow through the prosthesis.

Many ceramics known today are suitable for forming the porous core material of the present invention. Examples of suitable materials include alumina, synthetic aluminum silicates, glass compositions, and various pure mineral silicates. These can be cast in a mold using an aqueous vehicle and an inorganic chemical binder such as sodium silicate, phosphoric acid, or aluminum phosphate. They can also be pressed as a free flowing powder by die or isostatic pressing. These cast and molded or pressed ceramic bodies can be made resistant to body fluids by curing at an elevated temperature of at least 300° F., preferably 700° to 800° F. The resultant structures possess high porosity and good dimensional stability.

As mentioned previously, the porous material is primarily for the retention and flow of lubricating fluids for the joint. The fluid is retained in the pores and is pumped to the cartilage under pressure in a manner similar to squeezing a sponge. The presence of natural body fluids is a particularly beneficial feature of the present invention. Because the natural fluids are disposed near the joint where they can squeeze onto the cartilage, the necessity of replacing the entire joint and cartilage is avoided. The importance of the natural fluids was mentioned earlier. They serve the dual function of lubrication and nourishment of the cartilage. Just lubrication is not enough. Without nourishment the cartilage disintegrates and the joint will fail.

The outer layer of material is preferably formed of a ceramic matrix 16 having fibrous or filamentary reinforcing material 18 disposed within it. The material employed for the matrix 16 may be the same as or different from the material used in the core 12. The same materials listed above for the core are among those suitable for the matrix. The matrix is preferably formed by slip casting techniques. It is usually desirable that the matrix 16 be less porous than the core material 12. Porosity in any ceramic is easily controlled by proper selection of grain size, distribution and viscosity during forming in a manner well known in the art.

The reinforcing material 18 is discontinuous and is embedded in the low porosity matrix. In the illustrated embodiment reinforcement is provided by stainless steel oriented primarily in the direction of highest tensile stress on the member. The length of the reinforcing material may vary from relatively short fibers 18 (FIG. 1) to elongated filaments 18a (FIG. 2) extending the length of the member to be reinforced. It may also be randomly oriented if in a particular application the stresses will not be great enough to warrant the expense of orienting the fiber. For reasons of weight, reinforcing material 18 should preferably be limited to approximately 25 percent by weight of the composite 14. This limitation may require fiber orientation in certain applications where high strength is required. If fiber orientation is desirable, any technique is suitable, such as manual, magnetic or electrostatic orientation depending on the material employed. Other high strength materials may be substituted for stainless steel without departing from the scope of the invention. Examples of such materials are glass and boron fibers. As in the case of the matrix 16 and core 12 the reinforcing material 18 should be inert to body fluids since porosity in the matrix cannot be entirely eliminated.

If an elevated temperature process is employed the coefficient of expansion of the reinforcing material 18 is preferably greater than that of the matrix. For maximum effectiveness the reinforcing material 18 is then under tension for normal no load conditions.

The matrix 16 has been described as relatively nonporous. It should be pointed out that there are situations where porosity in the matrix is desirable. One example of the desirability of a porous matrix is the implant of a partial bone. This type of implant is in the nature of a splice. If the prosthesis is porous, the natural bone will actually knit with the prosthesis forming a strong bond of bone interwoven in the pores of the prosthesis. In this application a suitable prosthesis might include a ceramic of uniform porosity from center to surface having reinforcement embedded close to the surface.

It has been previously mentioned that all materials employed in a prosthesis must be immune to attack by body fluids. The chief factor in chemical attack by body fluids is the free chloride ion. Therefore a suitable material whether reinforcement, matrix or core should be relatively immune to attack by chloride ions.

The advantages of the present invention over existing prostheses are multiple. The materials are all free from reaction with and rejection by the body. The tensile strength of the ceramic is greatly improved by the reinforcement as is the flexural strength. The ceramic, even in its porous state, provides adequate compressive strength for joints while providing a path for maintaining natural body fluids in communication with the joint. Also, the replacement of the cartilage in the joint is avoided.

The following is an example of a prosthesis embodying the principles of the present invention.

EXAMPLE

A cylindrical core was first formed from a blend of an alumina and phosphoric acid. The alumina was composed of 3 parts of a −48 mesh and 1 part of a −325 mesh particle gradation. The acid was of an 85 percent concentration and admixed in the proportions of 1 part acid to 10 parts of the oxide. The mixture was placed in a rubber bag three-fourths inch in diameter and 5 inches long and the opening was sealed. The bag was placed in an isostatic press and subjected to 30,000 psi pressure. The pressed piece was placed in an oven at 100° C. for 4 hours and cured at 400° C. for 4 hours. This core was machined after curing to a proper prosthetic configuration and was permeable as formed.

A −325 mesh alumina powder was suspended in water by use of a household type mixer and stainless steel fibers were added in the amount of one-fourth the weight of the alumina. Phosphoric acid was added to make 10 percent of the solids. The paste was forced about the core section in a mold to form a thickness of one-fourth inch. This was allowed to dry for 24 hours in the opened mold, then heated 4 hours at 100° C. and 4 hours at 400° C. to cure the covering.

While the foregoing description has been directed primarily to use as a prosthesis the present invention finds other uses in any environment requiring structural integrity and nonreactivity with the environment.

We claim as our invention:
1. A prosthesis for human bone comprising
a composite material of a predetermined configuration,
said composite material comprising a matrix material and flexible, elongated reinforcing material, said reinforcing material and said matrix material being adapted to withstand contemplated tensile and bending forces applied to said prosthesis, and a porous ceramic material attached to said composite material and extending from one end to another end of said prosthesis, said porous material being sufficiently porous to permit movement of fluid therein, all of said materials being chemically inert to body fluids.

2. The prosthesis defined in claim 1 in which said reinforcing material comprises stainless steel filaments.

3. A prosthesis for human bone comprising a composite material of a predetermined configuration, said composite material comprising a ceramic matrix material and elongated reinforcing material, said reinforcing material and said matrix material being adapted to withstand contemplated tensile and bending forces applied to said prosthesis, and a porous ceramic material attached to said composite material at at least one extremity of said prosthesis, said porous material being adapted to act as a lubricable joint, said porous material forming a central core for said prosthesis and extending through the prosthesis to each surface of said prosthesis where a joint structure is desired whereby a receptacle is provided for retention and circulation of lubricants to the joint, all of said material being chemically inert to body fluids.

* * * * *